United States Patent
Nishizaki

[11] 3,901,951
[45] Aug. 26, 1975

[54] METHOD FOR TREATING WASTE PLASTICS

[75] Inventor: Hiroki Nishizaki, Sapporo, Japan

[73] Assignee: Director-General of the Agency of Industrial Science and Technology, Tokyo, Japan

[22] Filed: Mar. 26, 1973

[21] Appl. No.: 344,633

[30] Foreign Application Priority Data
Mar. 27, 1972 Japan.............................. 47-30494

[52] U.S. Cl. .......... 260/669 R; 260/2.3; 260/669 P; 260/683 R
[51] Int. Cl. ........................ C07c 3/26; C07c 15/10
[58] Field of Search......... 260/669 R, 669 P, 683 R, 260/2.3

[56] References Cited
UNITED STATES PATENTS
2,395,829  3/1946  King................................... 260/669
2,954,415  9/1960  Topsoe............................ 260/683 R
3,494,958  2/1970  Mannsfeld et al. ............. 260/680 R

*Primary Examiner*—C. Davis
*Attorney, Agent, or Firm*—William J. Daniel

[57] ABSTRACT

A method for treating waste plastics characterized by melting waste of plastics derived from at least one monomer selected from aliphatic and aromatic unsaturated hydrocarbons, bringing the melt into contact with a particulate solid heat medium in fluidized state maintained at a temperature of 350°–550°C to effect pyrolysis of the melt, and thereafter collecting and condensing the resulting gaseous product to recover a mixture of liquid hydrocarbons. Such mixture of liquid hydrocarbons contains ethylenically unsaturated compounds useful as starting material for the production of plastics, such as various olefins and styrene.

4 Claims, 1 Drawing Figure

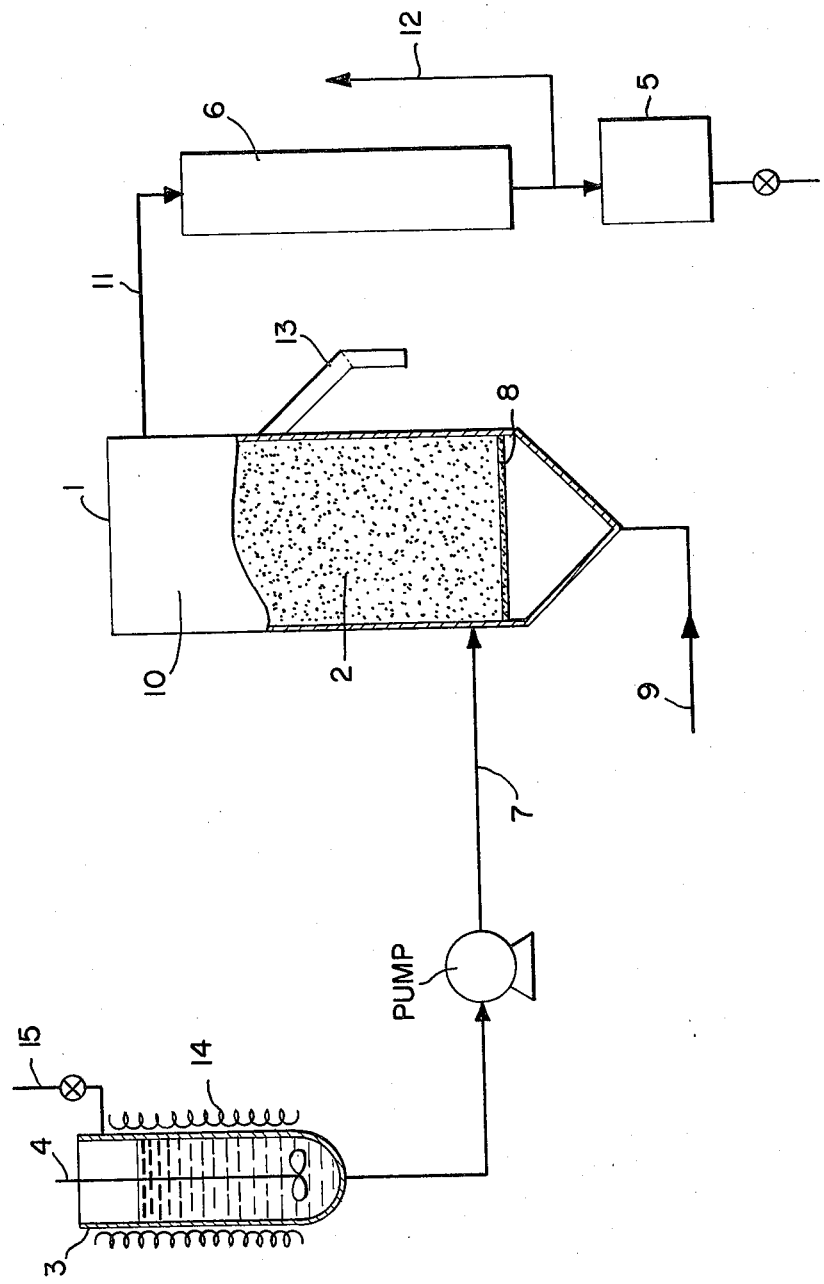

METHOD FOR TREATING WASTE PLASTICS

BACKGROUND OF THE INVENTION

The invention relates to a method for treating waste plastics. More particularly, this invention relates to an improved method for obtaining liquid hydrocarbons useful as starting material for various chemical products and as fuel by pyrolysis of waste plastics.

In recent years, the amount of plastics consumed in homes and factories shows an upward trend steadily with the development of the plastics industry. With the spread of plastic articles, disposition of waste plastic articles has become a serious object of public concern. Since plastics are not acted upon microbially, they cannot be decomposed naturally in the earth as in the case of other organic substances. As plastics generate a large quantity of heat on incineration, a furnace will be damaged considerably when plastics are burnt therein. Plastics find utilization for the so-called one-way packages such as containers or packing materials for various foods and drinks, as one of their applications. The quantity of these articles discarded after use runs up to an enormous level everyday, but an effective method for treating these articles has not yet been established.

Till now, trials were made to obtain useful low molecular compounds by pyrolysis of plastics and, in fact, several methods were brought forward. For example, the following methods are known: a method for obtaining styrene by pyrolysis of polystyrene at about 400°C, a method for obtaining oily substances by pyrolysis of polypropylene and polyethylene at a temperature of 100°–300°C and a method for recovering light oil by heating polyethylene in the heavy oil by means of microwave under reduced pressure. However, all of these methods are disadvantageous in that the rate of recovery is low and the recovered product is of less additional value. Thus, these methods make themselves unsatisfactory for practical use.

BRIEF SUMMARY OF THE INVENTION

Accordingly, it is an object of this invention to provide an effective method for treating waste plastics by pyrolysis. It is another object of this invention to provide a process for pyrolysis by which useful low molecular compounds can be obtained at a high rate of recovery from waste plastics. Other objects of this invention will be apparent as the description proceeds.

The single FIGURE is a flow system of the equipment for treating waste plastics according to the invention.

DETAILED DESCRIPTION OF THE INVENTION

In accordance with this invention, waste of plastics derived from at least one monomer selected from aliphatic and aromatic hydrocarbons is melted by heating and this melt is then brought into contact with a particulate solid heat medium maintained at a temperature of 350°–550°C to effect pyrolysis of the melt, whereby the melt can be converted in a high yield into unsaturated compounds which are liquid at room temperature and are useful as monomer or intermediate for various syntheses. The expression "plastics derived from at least one monomer selected from aliphatic and aromatic hydrocarbons" is used herein to mean polymers or copolymers composed of at least one monomer selected from aliphatic unsaturated hydrocarbons such as ethylene, propylene, butadiene and isoprene, and from aromatic unsaturated hydrocarbons, such as styrene, α-methyl-styrene and divinylbenzene; or copolymer of hydrocarbon monomers containing the above-mentioned monomers as the main component and/or non-hydrocarbon monomers.

According to the invention, waste plastics are charged as such or after being smashed into smaller pieces into a melting tank and are melted by heating to a temperature higher than their melting point. The molten waste plastics prepared in this way are then fed into a fluidized bed pyrolysis reaction unit containing a particulate heat medium such as sand, carbon powder, coal ash or solid catalyst in fluidized state, where the molten plastics are brought into contact with the fluidized heat medium to effect pyrolysis reaction. In this case, the molten plastics can be fed by any suitable means, such as natural gravity falling or pumping.

The reaction in the fluidized bed pyrolysis reaction unit is carried out at a temperature of 350°–550°C. Air may be used as fluidizing gas. When air is used, partial combustion of waste packages and reaction products occurs and the heat required for the reaction is self-provided.

In this case, the amount of air is 0.3 to 0.7 K$l$ per Kg of the starting material. The condition of the fluidized bed is maintained at a rate of initiating fluidization as near as possible. If the reaction temperature falls below 350°C in the practice of the method of this invention, the rate of pyrolysis reaction will become so small as to make it difficult to perform the operation. On the other hand, if the reaction temperature rises above 550°C, more complete combustion with accompanying black smoke and steam will occur, resulting in the elevation of the reaction temperature up to about 1,000 and several hundred degrees. The rate of introduction of the fluidizing gas is preferably maintained within the range of 1–3 cm/second. When the pyrolysis reaction is performed with the rate of introduction of the fluidizing gas being maintained within the above-mentioned range, an excellent yield of oils from the waste plastics will be obtained. If the rate deviates from this range, the yield of oils will tend to decrease. Besides the above-mentioned air, nitrogen, hydrogen, steam, gas formed by the pyrolysis reaction and a mixture of these gases may be used, as fluidizing gas for the method of this invention.

An example of a system for carrying out this invention will be explained with reference to the accompanying drawing. In the drawing, the numeral 1 generally designates a fluidized bed pyrolysis reaction unit having a fluidized heat medium layer 2 therein, a melting tank 3 having a stirrer, recovery tank 5 and a condenser 6.

Solid package wastes, such as used container for Yakult, are introduced into the melting tank 3 through its top, the tank being installed in the neighborhood of the pyrolysis reaction unit 1, and are melted by heating at a temperature below 250°C by means of an external heater 14. The resultant melt is then introduced, as by means of natural gravity falling or through a conduit 7 by means of pumping (as shown in the drawing) into the fluidized heat medium layer 2 of the pyrolysis reaction unit 1 heated at 350°–500°C, preferably at 400°–500°C, where the melt undergoes pyrolysis.

In this case, the fluidized heat medium layer 2 can be formed by fluidizing a proper particulate heat medium, such as carbon, sand or catalyst, charged into the pyrolysis reaction unit 1 to an adequate height by flowing a suitable fluidizing gas, for example, air, into the unit through a conduit 9 connected to the bottom thereof and through a distributor 8 provided at the bottom of the unit 1. Heating of the fluidized heat medium can be effected by external heating of the unit 1 with an appropriate heating means, such as an electric heater or by using gas and oil produced by pyrolysis as the heat source. As shown in the accompanying drawing, heating of the medium can be effected also by internal heating caused by oxidative combustion of the starting material, using air in an amount of 3–5% by weight of the starting material. A gas produced by pyrolysis of the molten waste in the pyrolysis reaction unit 1 is taken out together with the fluidizing gas through a conduit 11 connected to the upper part of the unit through the upper space 10 of the unit 1. In this case, a few percent of the gas produced by the pyrolysis reaction may undergo pyrolysis reaction also in the upper space 10. The gas released from the conduit 11 is introduced into the condenser 6 where the gas is condensed by an adequate cooling medium such as water or air.

The pyrolyzed product which is liquid at room temperature is stored in a pyrolyzed liquid recovery tank 5, and the pyrolyzed product which is gaseous at room temperature and the fluidizing gas are exhausted from an exhaust pipe 12.

In the practice of this invention, any inorganic substance attached to the waste will not be pyrolyzed but will remain in the fluidized layer 2 and move together with the fluidized medium. Such inorganic substance is discharged through an overflow pipe 13 together with the medium. The inorganic substance is separated from the medium and the medium is returned to the layer for recycling. A gas purged from the condenser can be used again as fluidizing gas after measurement with an adequate gas meter and mixture with air.

The pyrolyzed liquid product thus obtained as a mixture of liquid hydrocarbons containing those having unsaturated bonds as the main component and saturated hydrocarbons and aromatic hydrocarbons as other components. Thus, the product can be used as starting material for high molecular compounds and other chemicals by separating and purifying it with a proper means. According to the method of this invention, monomers can be recovered in an extremely high yield, for example, in a yield of at least 70%, from waste of solid high molecular substances such as waste of various packages, by a simple method of pyrolysis. This is indeed surprising, considering the fact that the yield in the synthesis of monomers from petroleum is less than 30%.

The method of this invention can be applied advantageously to the treatment of waste of solid high molecular substances derived from various hydrocarbons, especially to the treatment of waste of packages, such as plastic containers for milk and lactic acid drinks, and of packing materials. Waste which can be treated especially advantageously by the method of this invention is packing materials and containers made of polystyrene.

This invention will be illustrated in more detail by the following examples.

EXAMPLE 1

Waste of the packages (small bottles for Yakult) made of polystyrene (copolymer of 97% by weight of styrene and 3% by weight of butylene rubber) with a specific gravity of 0.98–1.05 and a melting point of 200°–400°C is pyrolyzed under the conditions shown in the following table, employing the system shown in the drawing. In this case, a tube of 108 mm in inner diameter and 100 mm in height, packed with sand of 0.2 mm in average diameter as heat medium is used as the pyrolysis reaction unit 1 and the sand is fluidized with air to the height of 200–250 mm.

Heating of the pyrolysis reaction unit 1 is effected by using partial combustion heat generated by oxidation reaction between the waste and the fluidizing air jointly with heat from an electric heater. Both the results of the reaction and the reaction conditions employed are shown in the following table.

TABLE 1

|  |  | Test 1 | Test 2 |
| --- | --- | --- | --- |
| Reaction Conditions | Melt. Temp. (°C) | 240 | 240 |
|  | Temp. of Pyrolysis (°C) | 400 | 490 |
|  | Wt. of Starting Materials (kg/hr) | 1.0 | 2.0 |
|  | Vol. of Fluidizing Air (l/hr) | 700 | 700 |
| Yield (% by wt starting waste) | Carbon | 0 | 0 |
|  | Gas | 8 | 12 |
|  | Total Oils | 92 | 88 |
|  |  | 100 | 100 |
| Analysis of Recovered Oils | Amt Styrene as % of Total Oils | 65 | 58 |
|  | Amt Other Oils as % of Total Oils | 35 | 42 |
|  |  | 100 | 100 |
|  | Amt Styrene as % of Starting Waste | 59.8 | 51 |
|  | Amt Other Oils as % of Starting Waste | 32.2 | 37 |
|  |  | 92.0 | 88 |

EXAMPLE 2

High pressure polyethylene having a specific gravity of 0.92 and a melting point of 130°–150°C and isotactic polypropylene having a specific gravity of 0.90–0.91 and a melting point of 160°–170°C are separately pyrolyzed under the conditions shown in Table 2, employing the same system as in Example 1.

Heating of the pyrolysis reaction unit 1 is performed with an external electric heater and nitrogen is employed as fluidizing gas.

Both the results of reaction and the reaction conditions are shown in the following table.

TABLE 2

|  |  | Test 1 Poly-Ethylene | Test 2 Polypropylene |
| --- | --- | --- | --- |
| Reaction Conditions | Melt. Temp. (°C) | 200 ± 20 | 220 ± 20 |
|  | Temp of Pyrolysis (°C) | 500 | 500 |
|  | Wt. of Starting Materials (kg/hr) | 2.0 | 1.5 |
|  | Vol of Fluidizing Gas ($N_2$) (l/hr) | 720 | 720 |
| Yield (% by wt Starting Waste) | Carbon | 0.2 | 0.5 |
|  | Gas | 7.8 | 10.5 |
|  | Total Oils | 92.0 | 89.0 |
|  |  | 100.0 | 100.0 |
| Analysis | Amt Straight Chain Hydrocarbon (as % of total oils) | 74 | — |

TABLE 2-Continued

|  |  | Test 1 Poly-Ethylene | Test 2 Polypropylene |
|---|---|---|---|
| of Recovered Oils | (as % of Starting Waste) | 68.1 | — |
|  | Amt Liquid Olefin (as % of total oils) | 41 | 37 |
|  | (as % of Starting Waste) | 37.7 | 32.9 |

What is claimed is:

1. A method for recovering useful components from waste plastic derived from at least one monomer selected from aliphatic and aromatic unsaturated hydrocarbons, characterized by melting the waste plastic, bringing the melt into contact with a particulate solid heat medium in fluidized state maintained at a temperature of 350°–550°C to effect pyrolysis of the melt, and thereafter collecting and condensing the resultant gaseous product to recover a mixture of liquid hydrocarbons.

2. A method according to claim 1 wherein sand is used as the particulate solid heat medium.

3. A method according to claim 1 wherein air is used for fluidizing the particulate solid heat medium.

4. A method according to claim 3 wherein the amount of air for fluidization is about 0.3–0.7 Kl per Kg of waste plastic.

* * * * *